United States Patent [19]

Nagamine

[11] Patent Number: 5,419,714
[45] Date of Patent: May 30, 1995

[54] BOLT-FASTENING CONNECTOR

[75] Inventor: Akira Nagamine, Kawasaki, Japan

[73] Assignee: The Whitaker Corporation, Wilmington, Del.

[21] Appl. No.: 246,905

[22] Filed: May 20, 1994

[30] Foreign Application Priority Data

Jun. 2, 1993 [JP] Japan ................................. 5-034868
Feb. 3, 1994 [JP] Japan ................................. 6-031911

[51] Int. Cl.$^6$ ........................................ H01R 13/621
[52] U.S. Cl. .................................. 439/364; 439/475; 439/489
[58] Field of Search ............................ 439/362–365, 439/359–361, 744, 475, 489; 403/269, 266, 179, 404; 411/301, 432, 437, 525–527, 907, 908

[56] References Cited

U.S. PATENT DOCUMENTS

| | | | |
|---|---|---|---|
| 3,764,957 | 10/1973 | Iversen | 411/525 |
| 4,456,319 | 6/1984 | Poulain Ricros | 439/359 |
| 4,684,190 | 8/1987 | Clark et al. | 439/364 |
| 5,201,625 | 4/1993 | Takenouchi et al. | 439/364 |
| 5,228,867 | 7/1993 | Nagamine | 439/364 |
| 5,295,756 | 3/1994 | Ohta | 439/359 |

FOREIGN PATENT DOCUMENTS

| | | |
|---|---|---|
| 62-188188 | 8/1987 | Japan . |
| 2-59584 | 5/1990 | Japan . |
| 2208497 | 4/1989 | United Kingdom . |
| 2208497 | 4/1989 | United Kingdom . |
| 2262727 | 6/1993 | United Kingdom . |
| 2262767 | 6/1993 | United Kingdom . |
| 2270592 | 3/1994 | United Kingdom . |

*Primary Examiner*—Gary F. Paumen
*Attorney, Agent, or Firm*—Adrian J. LaRue; Mary K. VanAtten

[57] ABSTRACT

A bolt-fastened connector featuring an easy securing of the bolt in the housing while making it possible to achieve a compact design with a high density of elements is achieved. The bolt-fastened connector (2) comprises first housing (10) accommodating the bolt (20) and the second housing (40) having multiple contacts. A metal member (80) having several spring blades (82) is embedded in an inner wall (58) of a bolt-insertion opening (54) of the second housing (40). When the tip of the bolt (20) retained in the first housing (10) is inserted in the bolt-insertion opening (54), the spring blades (82) snap into a recess of the bolt (20), thereby securing the bolt (20) and the first housing (10) in the second housing (40).

10 Claims, 9 Drawing Sheets

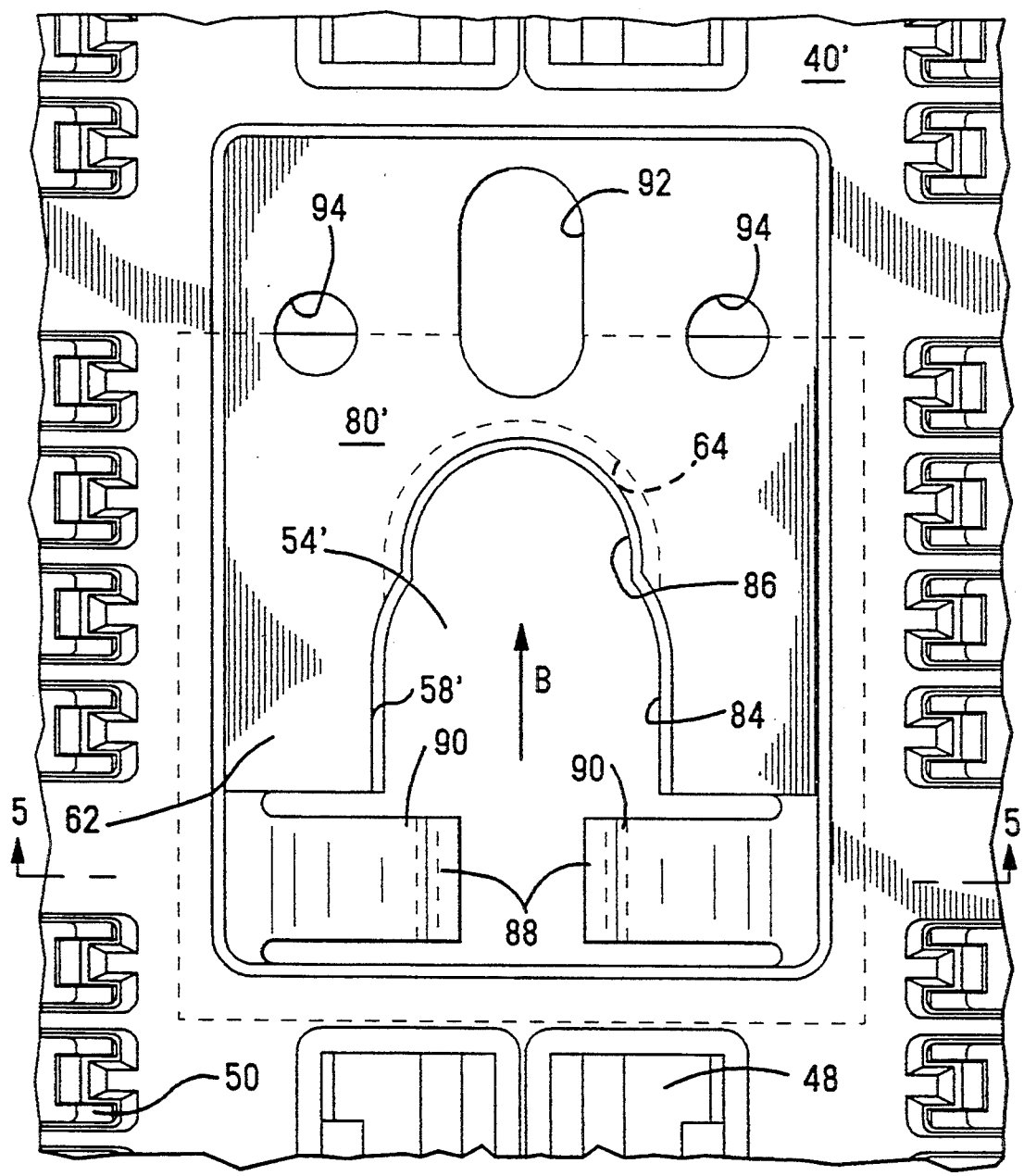
_Fig. 4_
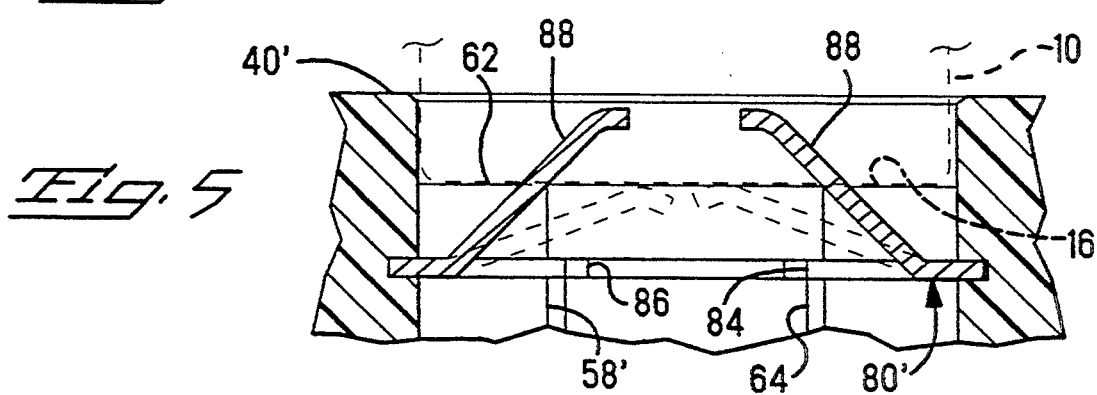
_Fig. 5_

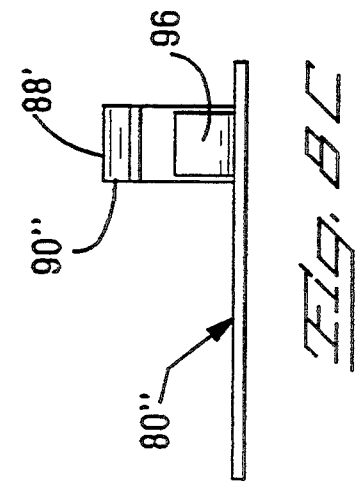
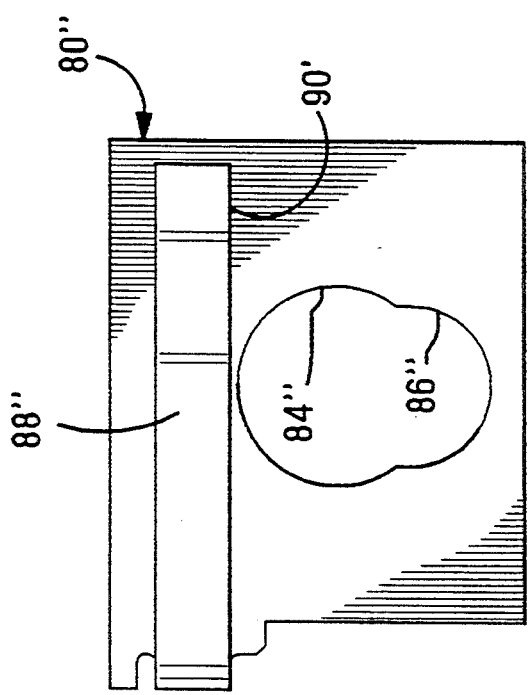
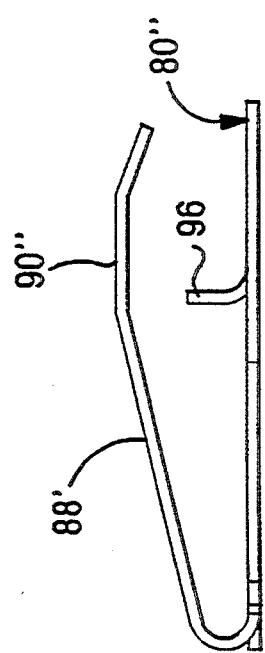

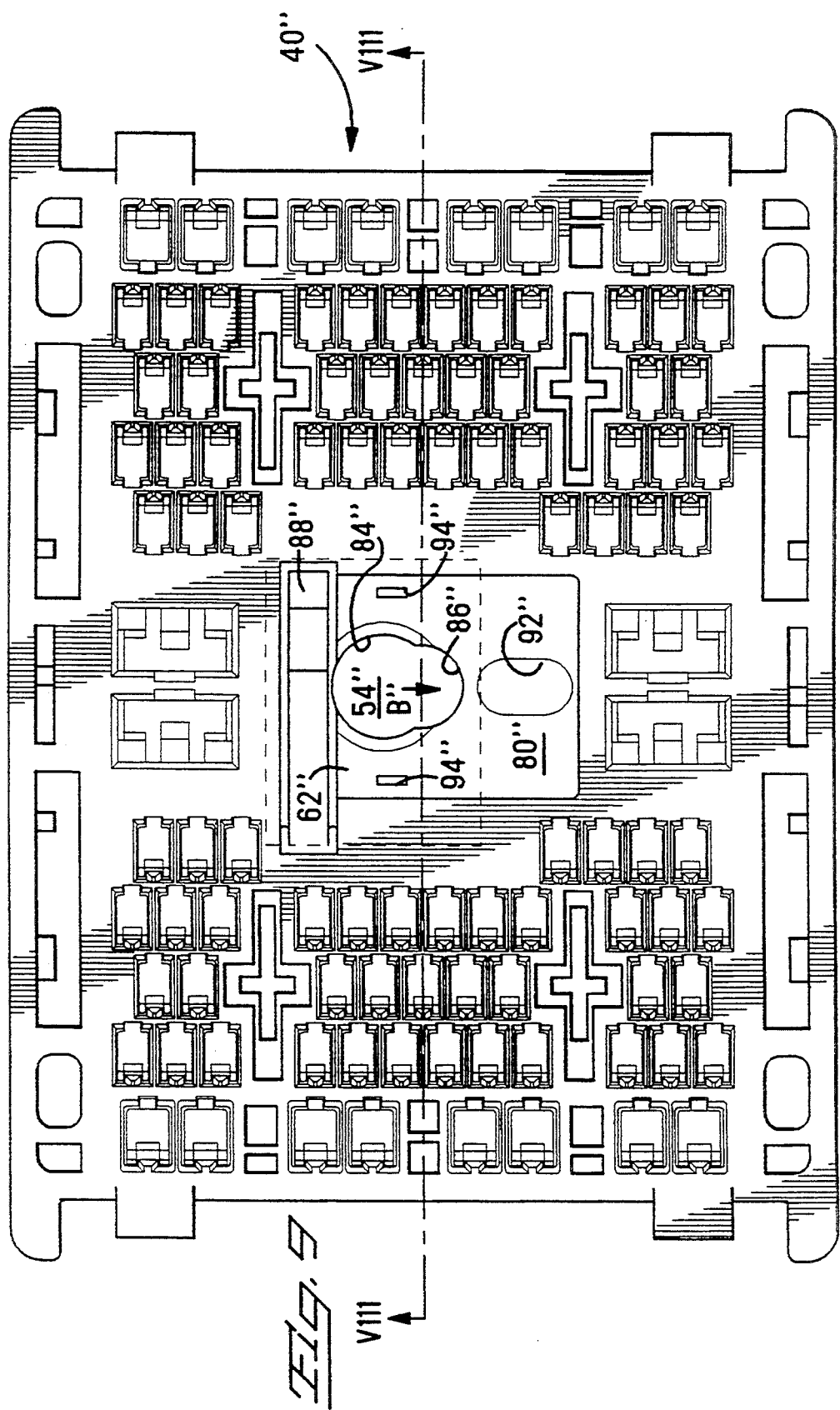

BOLT-FASTENING CONNECTOR

FIELD OF THE INVENTION

This invention relates to connectors with bolt fastening, especially to connectors fastened to mating connectors by means of a bolt and a nut.

BACKGROUND OF THE INVENTION

Increasing sophistication and complexity of electric equipment installed in cars and other vehicles led to increasing diversification of the connectors used for connecting such equipment. Generally, an increase in the number of contacts in a connector results in a stronger force required for joining matching halves of the connector, to a degree that, in some cases, manual connection becomes extremely difficult or even impossible. Therefore, a number of designs were suggested in which one connector housing has a nut and the other connector housing has a bolt, and their joining is carried out using nut and bolt threads by means of, for example, an air screw or bolt driver. FIG. 6 is a cross section of an embodiment of a conventional connector with bolt fastening means disclosed in Japanese UM Publication (1990)-59584. In this embodiment, nut 102 is embedded in one connector housing 100, and bolt 120 is retained in the other connector housing 110 by means of a push nut 130.

The push nut 130 retains the bolt 120 due to friction between its blades 132 and cylindrical surface 122 of the bolt along its axis. In order to prevent disengagement of the bolt 120 from the push nut 130 and to provide resistance against a force pulling apart the pair of connectors 100, 110, it is necessary to create a strong friction between the blades 132 and the cylindrical surface 122 of the bolt 120. Because of this, a special tool is used for fitting the push nut 130 over the cylindrical surface of the bolt 120, thus making the operation of securing the bolt 120 in the housing 110 rather complicated. Another disadvantage of this design consists in a non-uniform quality of connectors due to the fact that the blades 132 move along a straight surface of the bolt 120 without a specified location to stop. The fact that the head 124 of the bolt 120 extends above the surface of the connector housing 110 may be a problem in using robots for automatic insertion of contacts (not shown in the drawing).

In order to overcome this problem, a bolt-fastened connector shown in FIG. 7 and disclosed in Japanese Patent Publication (1987)-188188 was offered in which the bolt retaining housing 210 is separate from the main housing 200 and is inserted in the compartment 202 of the main housing 200 after contact insertion operation is completed. In this bolt-fastened connector, the bolt 220 is retained in the bolt-retaining housing 210 by means of a stopper (not shown in the drawing), and the bolt-retaining housing 210 is held in the main housing 200 by means of latches 212 made integral with the housing which are engaged in the latching recesses 204 in the main housing 200.

However, in such bolt-fastened connectors made of two housings 200 and 210, the operation of fixing the bolt 220 in the bolt-retaining housing 210 requires special tooling, and the operation itself is not easy. Moreover, since the disconnecting of this connector from a matable connector (not shown in the drawing) requires rather large effort, the latches 212 and the recesses 204 must be rather large to withstand such forces applied to them during disconnecting. Because of this, the devices provided specifically for securing the bolt-retaining housing 210 in the main housing 200 occupy a considerably large area, thus compromising compactness of the connector. In an event of damage caused by the overtightening of the bolt 220, it is necessary to replace the entire bolt-retaining housing 210. However, since the latches 212 are locked in the compartment 202, removal of the bolt-retaining housing presents certain difficulties.

For this reason, a bolt-fastened connector (shown in FIG. 11) was proposed in which the bolt 330 and the bolt retaining housing 320 are fixed to the main housing 300 by means of a flat plate 310 fitting over the neck 332 of the bolt 330 as disclosed in Japanese UM Publication (1992)-32702. The operation related to the installation of the bolt 330 in this bolt-fastened connector is relatively easy, because no push nuts, stoppers or similar parts are required. In addition, because the bolt retaining housing 320 is joined to the main housing 300 indirectly by means of the bolt 330 and the plate 310, it can be easily removed from the main housing 300 by breaking the neck 332 of the bolt 330.

However, application of such a design with a plate for the fixing of the bolt to a connector with multiple contacts shown in FIG. 7, may result in the following problem. Since the opening for the retaining plate intersects the contact receptacle chamber, the plate reduces the useful area available for contacts, thus compromising compactness of the connector and density of contacts in it.

SUMMARY OF THE INVENTION

Therefore, the purpose of this invention is to solve the problems mentioned above and to offer a bolt-fastened connector in which the installation of the bolt can be carried out easily without compromising the compactness of the connector and the density of contacts in it.

The bolt-fastened connector according to this invention is characterized by the fact that it comprises a connector housing fastened to a mating connector housing by means of a the bolt and comprises a first housing in which bolt head is retained, a second housing having an opening into which the bolt tip is inserted and a metal fastener fitting in a recess in the shaft of the bolt and preventing the bolt from removal, the fastener being secured in a wall of the opening.

When the bolt contained in the first housing is inserted in the opening made in the second housing, the fastener secured in the wall of the opening latches in the bolt recess, thus fixing the bolt and the first housing to the second housing. This operation does not require any special tools and it can be accomplished with only slight effort. Since this fastener does not occupy a large area, the connector is small and suitable for a high density array of contacts.

BRIEF DESCRIPTION OF THE DRAWINGS

Embodiments of the invention will now be described by way of example with reference to the accompanying drawings in which:

FIG. 4 is a plan view of essential elements of a second embodiment of the invention.

FIG. 5 is a cross section taken along line 5-5 of FIG. 4.

FIGS. 8(A) to 8(C) show a metal stopper used in the third embodiment of bolt-fastened connectors according to this invention; (A) plan view, (B) front view, (C) right-side view.

FIG. 9 is a plan view showing essential elements of the third embodiment of this invention.

DETAILED DESCRIPTION OF THE INVENTION

Figure 1:
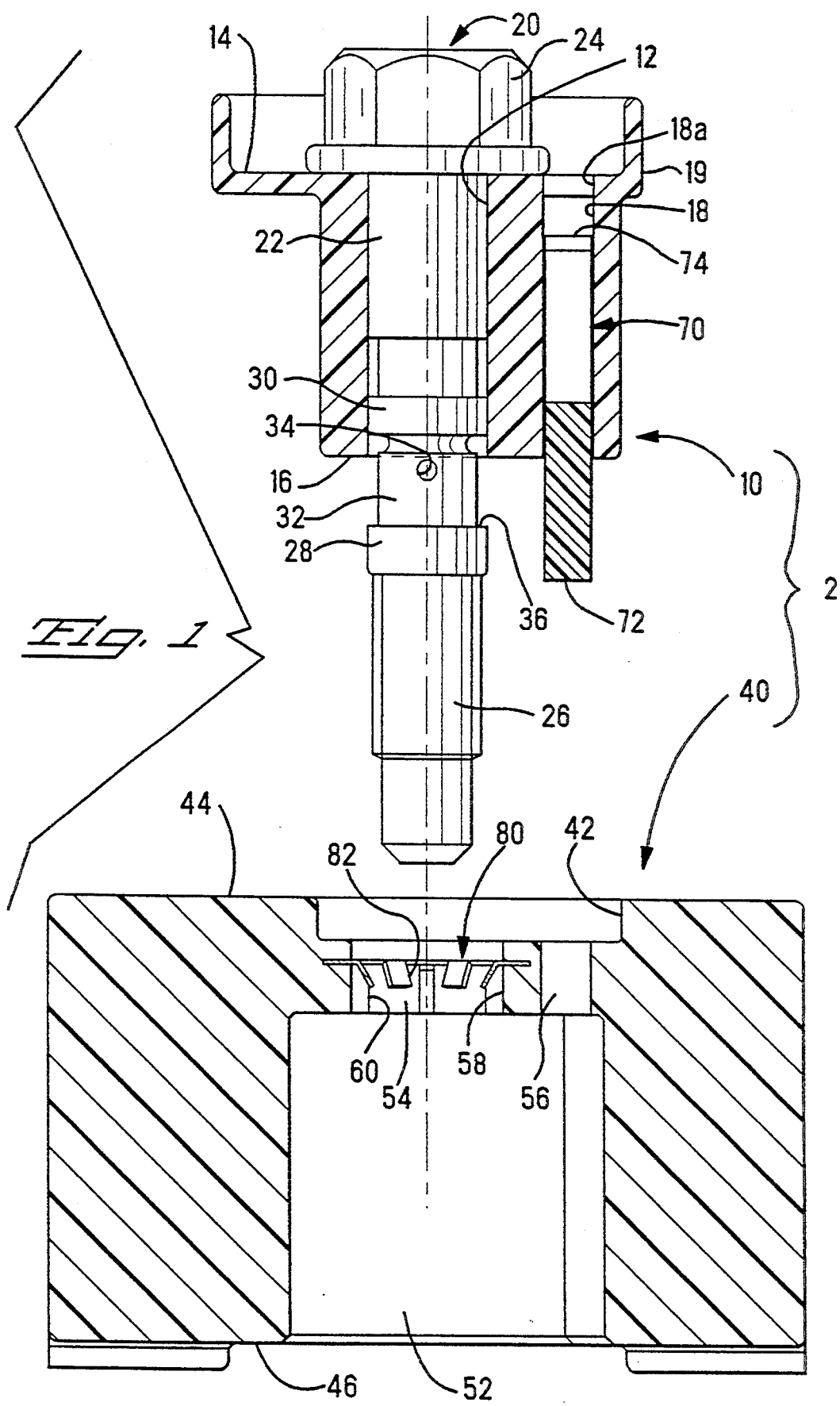
FIG. 1 is an exploded cross-sectional view of an embodiment of the bolt-fastened connector according to this invention.

A plug connector 2 consists of the first housing 10 containing the bolt 20 and the second housing 40 having a number of contacts (not shown in the drawing); it is intended for connection to a mating connector (not shown in the drawing) having a nut (not shown in the drawing). The shaft 22 of the bolt 20 fits in the opening 12 of the first housing 10, and the head 24 of the bolt 20 rests on the end 14 of the housing. The other end 16 of the first housing 10 comes in contact with the bottom surface of the receiving chamber 42 of the second housing 40. Next to opening 12, a slot 18 is located for receiving an indicator 70. When the plug connector 2 is joined with the mating connector, one end 72 of the indicator 70 comes in contact with the mating connector pushing the indicator 70 upward so that the other end 74 appears through the opening 18a of the slot 18. This indicates to the worker that the connectors are properly joined. Detailed explanations concerning the indicator can be found in Japanese Utility Model Publication No. 1992-11329. At the circumference of the end 14 of the first housing 10, a wall 19 prevents electric wires from being caught between the bolt head 24 and the end 14.

Figure 2:
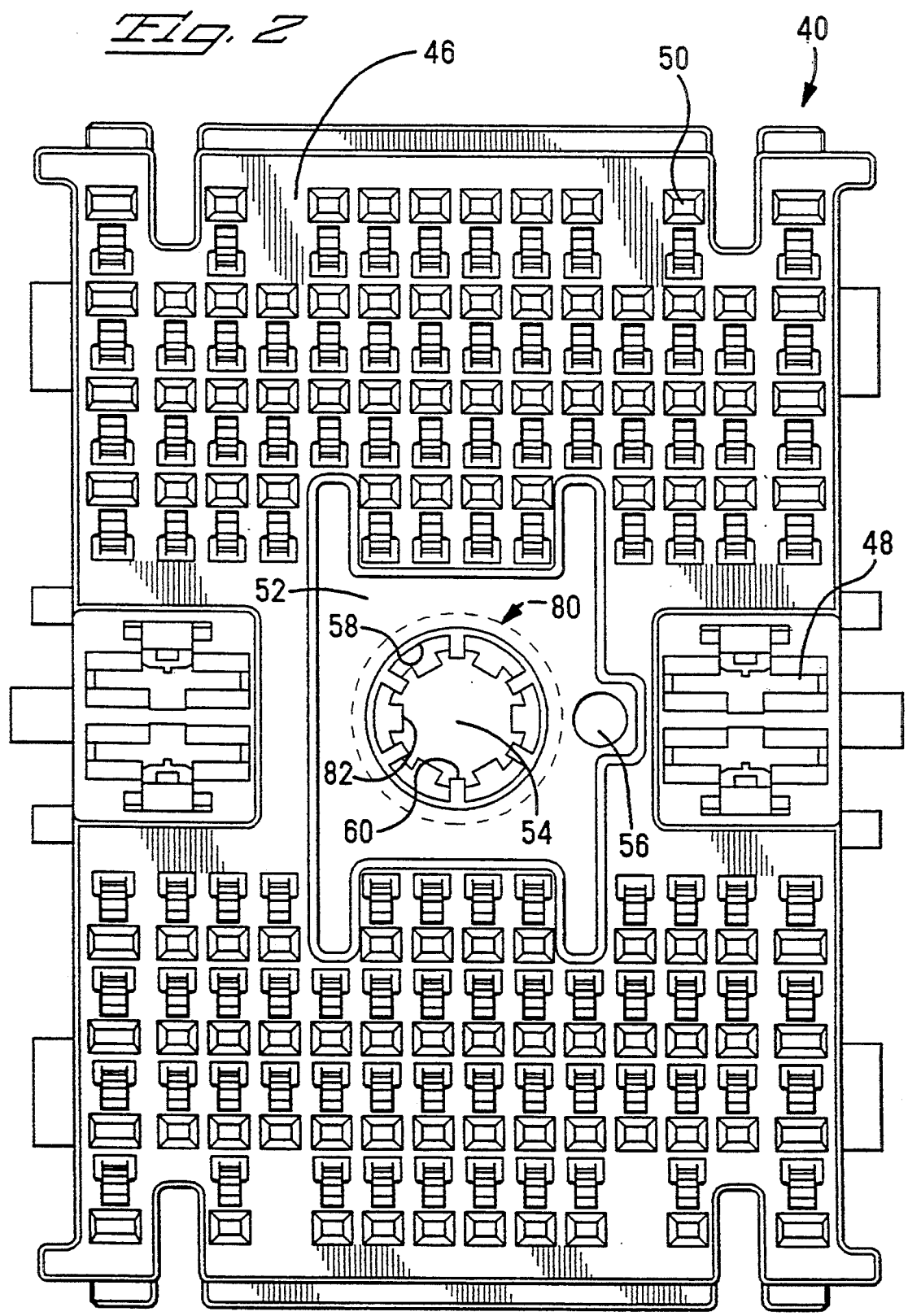
FIG. 2 is a plan view of the bottom surface of the second housing.

The second housing 40 has at one end surface 44 for the insertion of the contacts and at the other end it has joining surface 46, with a number through holes 48, 50 for contacts between these two surfaces (FIG. 2). A recess 52 in housing 40 is for the purpose of guiding the mating connector housing (not shown in the drawing) during joining. A through hole 54 accommodating the bolt 20 and the indicator slot 56 accommodating the indicator 70 are disposed between recess 52 and the receiving chamber 42 of the second housing. An annular-shaped metal insert 80 having several spring blades 82 (in this embodiment 6 blades) tilted downward is fixed in the internal wall 58 of the through hole 54 for the bolt. As explained below, the spring blades 82 snap into the recess 36 of the bolt 20 securing the bolt 20 in the housing. As shown in FIG. 2, between adjacent blades 82 ribs 60 are formed extending from the inner wall 58 toward the axis of the through hole 54. The inner diameter of the free space between the tips of the ribs 60 is slightly larger than the outer diameter of the enlargement 28 on the stem of the bolt 20 above its threaded portion 26. Therefore, these ribs do not interfere with the rotation of the bolt 20 inside the through hole 54, and at the same time keeps it from misalignment in relation to the second housing 40.

The bolt 20 has a hole 34 drilled diametrally in the portion of the smaller diameter 32 made between the middle enlargement 30 and the enlargement 28 adjacent to the threaded portion 26. The cross-section of the portion of the bolt, in which this hole 34 is made, is smaller than any other part of the bolt, and if torque applied to the bolt 20 exceeds a certain value, it easily breaks. This is especially true because the hole 34 passes through the center of the stem of the bolt 20. Usually, when a torque applied to the bolt is sufficiently large for breaking it, the deformation at the circumference is considerably more extensive than at the center, and because the center is hollowed out, the brakeage occurs easily. Therefore, the hole 34 in the bolt 20 makes it possible to greatly reduce the braking torque. This prevents the housing being damaged due to overtightening of the bolt. The damage to the housing can be prevented also by means of a smaller diameter neck 38 (FIG. 3) in the bolt 20 instead of the hole 34; however, in this case the braking torque value is larger.

Figure 3:
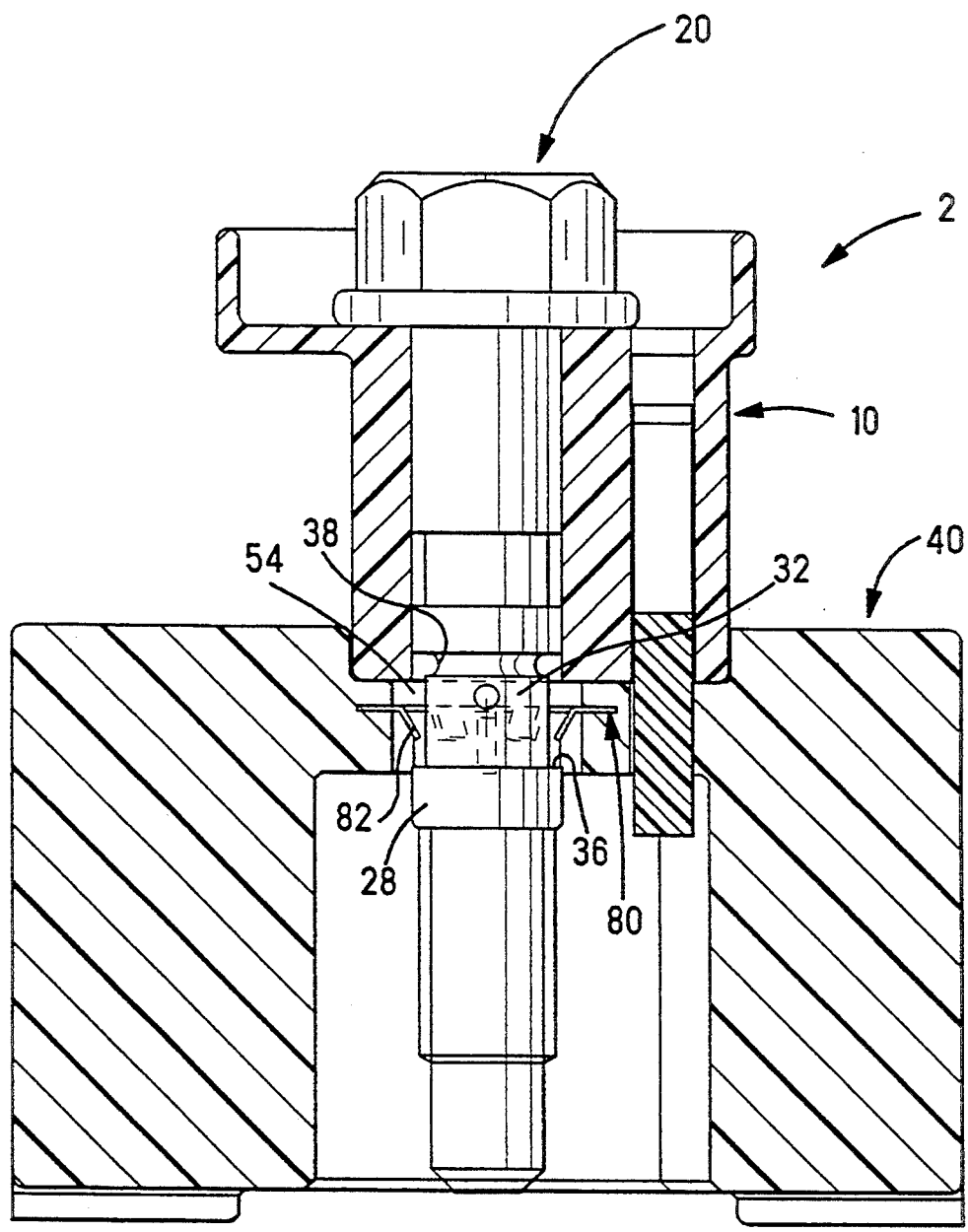
FIG. 3 is a cross-sectional view of the assembled connector shown in FIG. 2.
Figure 6:
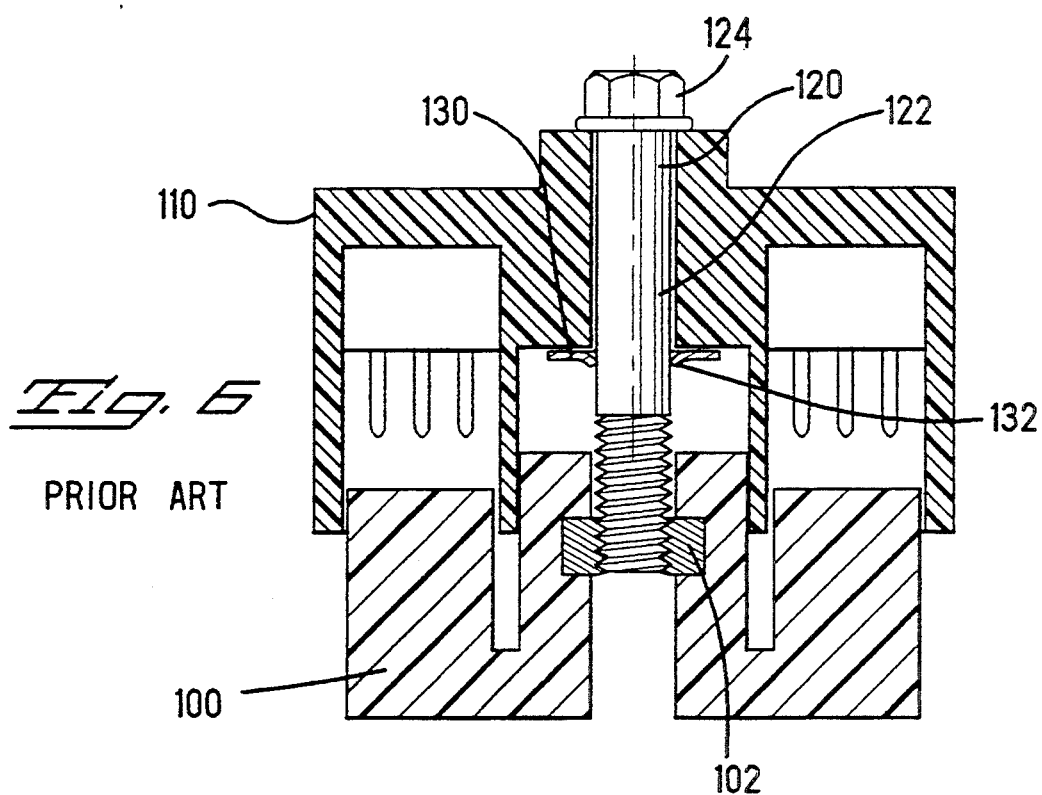
FIG. 6 is a cross sectional view of a conventional connector.
Figure 7:
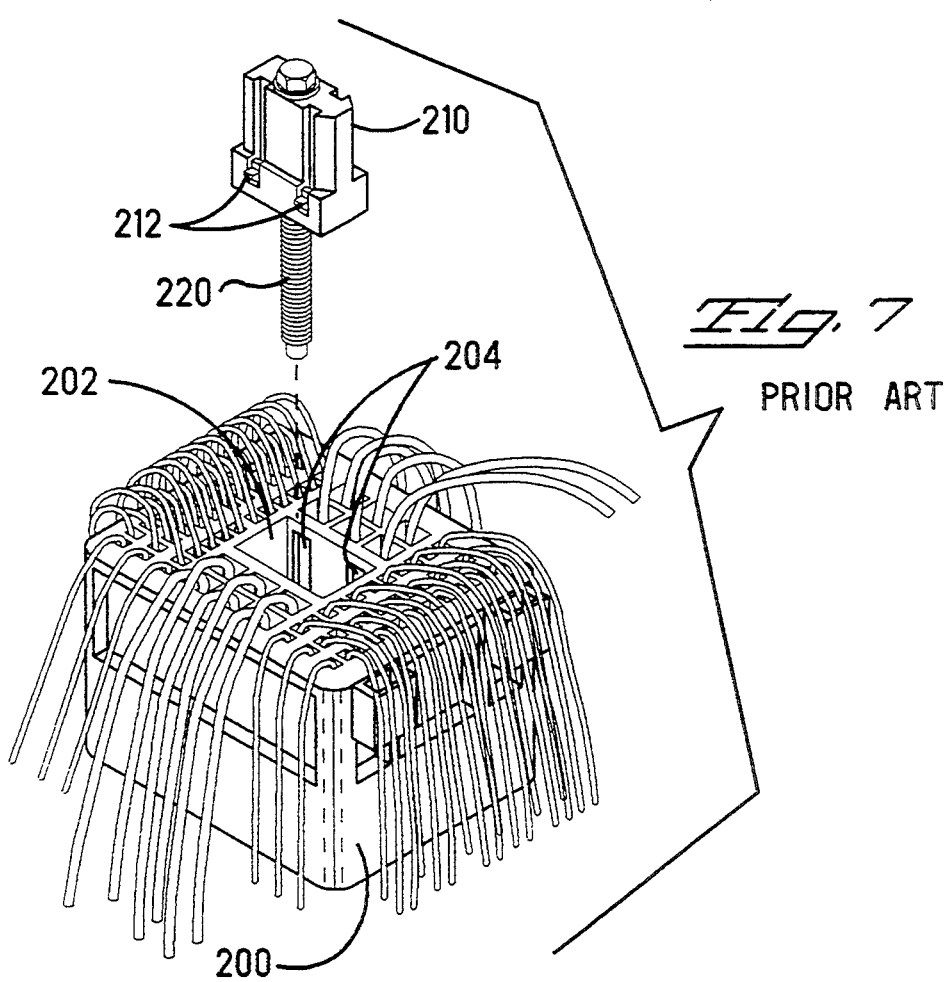
FIG. 7 is a perspective exploded view of another conventional connector.

FIG. 3 represents a cross section of the first housing 10 and the second housing 40 after they are assembled together. The tip of the bolt 20 passed through the first housing 10 is inserted in the through hole 54 for the bolt of the second housing 40 into which the contacts (not shown in the drawing) with connected electrical wires have been installed by an automatic machine. The spring blades 82 of the metal insert 80 tilted downward are first bent inwardly by the portion of the bolt of enlarged diameter and then return to their original position when they are positioned next to the portion of a smaller diameter. If the bolt 20 is moved in the upward direction as depicted in the drawing, the tips of the blades 82 become engaged with the bottom surface of the recess 36 of the bolt 20 thereby stopping it. This arrangement makes it possible to easily join the first housing 10 with the bolt 20 to the second housing 40 in the connector according to this invention.

FIGS. 4 and 5 represent another embodiment of a bolt-fastened connector according to this invention. The difference from the first embodiment is that a flat metal member 80' is insert-molded in the internal wall 58' of the opening 54' for the bolt. This metal member 80' has a cut-out 84 which can accommodate the bolt 20 (FIG. 1) and a bolt-retaining recess 86 as part of the cut-out 84. The bolt-retaining recess 86 prevents the bolt 20 from being pulled out by interfering with the recess 36 (FIG. 1) of the bolt 20. Next to the bolt accommodating cut-out 84, a pair of upwardly-directed spring arms 88 is disposed. Side surfaces 90 of the spring arms 88 prevent removal of the first housing 10 from the second housing 40' by interfering with the side surfaces of the first housing 10. A slot 92 for the insertion of an indicator is located adjacent to the bolt retaining recess 86. On both sides of this indicator slot 92, two round openings 94 are positioned. These round openings 94 are for pins (not shown in the drawing) holding the metal member 80' inside the mold (not shown in the drawing) during the insert-molding operation.

Next, an explanation is set forth concerning the assembly of the bolt 20 and the first housing 10 with the second housing 40' with embedded metal member 80'. First, the tip of the bolt (not shown in the drawing) placed into the first housing 10 is inserted in the bolt cut-out 84 of the metal member 80'. Since at this time, the other end 16 of the first housing 10 is pushing on spring arms 88 it bends them to a position shown in the FIG. 5 by broken lines, and the other end 16 of the first housing 10 comes in contact with the bottom surface 62 of the second housing 40'. Next, the first housing 10 is moved along the bottom surface 62 of the second housing in a direction perpendicular to the direction of the insertion of the tip of the bolt 20, that is in the direction indicated by arrow B. Because of this motion, the recess 36 of the bolt 20 enters the bolt retaining recess 86 of the metal member 80'. At the same time, the other end 16 of the first housing 10 disengages from the spring arms 88, 88, and the side surface 90 of the spring arms 88 comes in contact with the side surface of the first housing 10, thereby locking the first housing 10 in place. Since there is ample space for the large diameter section 28 of the bolt 20 between the inside wall 64 of the second housing at the back side of the metal member 80' the bolt recess 36 is reliably retained by the member 80'. The portion of the member 80' which is in contact with the recess 36 of the bolt 20 is flat, thus providing favorable friction conditions.

It is also possible to use, instead of the spring arms 88 of the metal member 80' spring arms molded from a resin as an integral part of the inner wall 58' of the second housing 40'. Metal member 80' need not necessarily be embedded by an insert-molding process. It can be secured prior to the insertion of the contacts by means of members molded on the sides of the housing.

Figure 10:
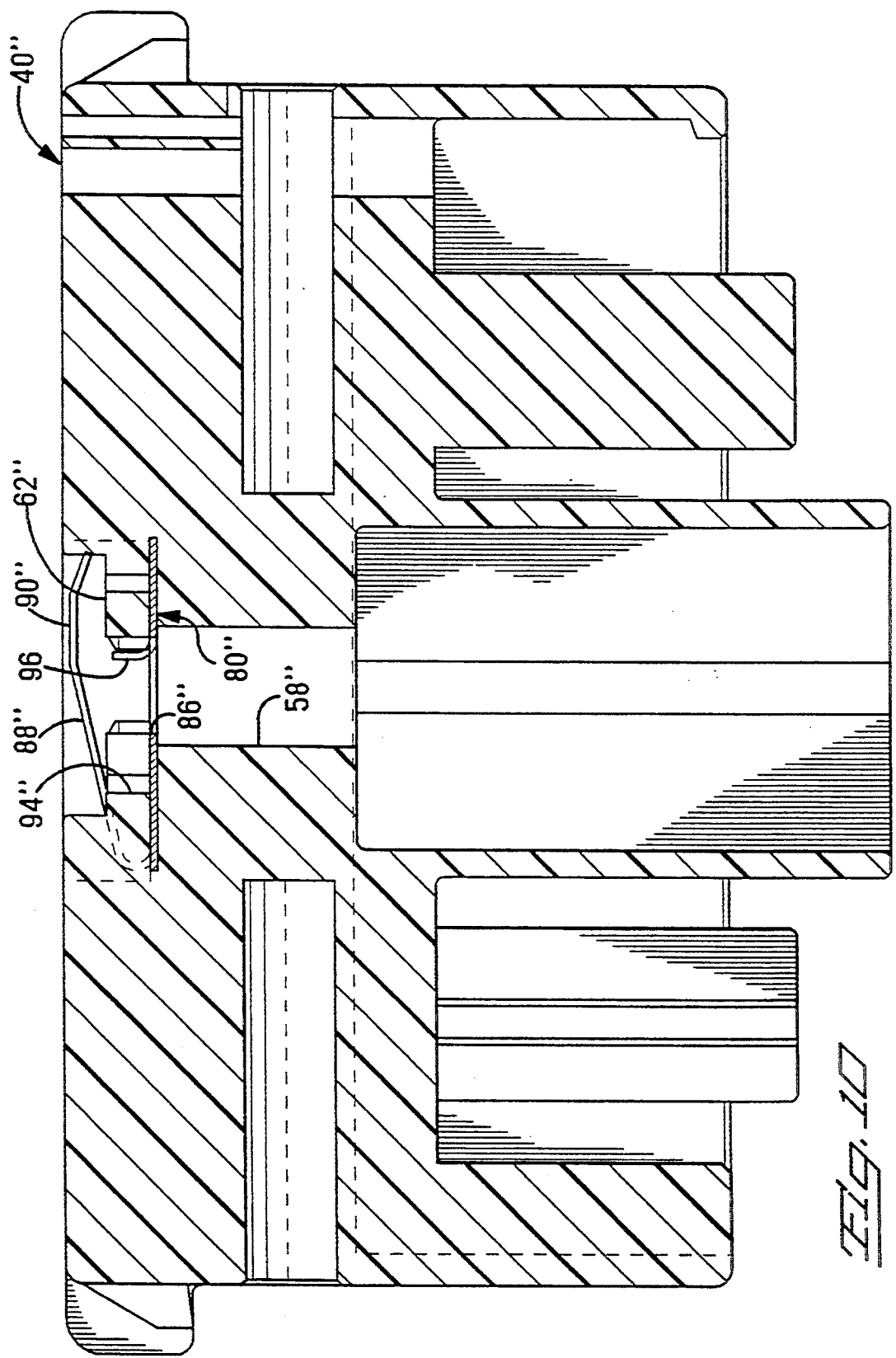
FIG. 10 is a cross section of the device shown in the FIG. 7 along VIII—VIII.
Figure 11:
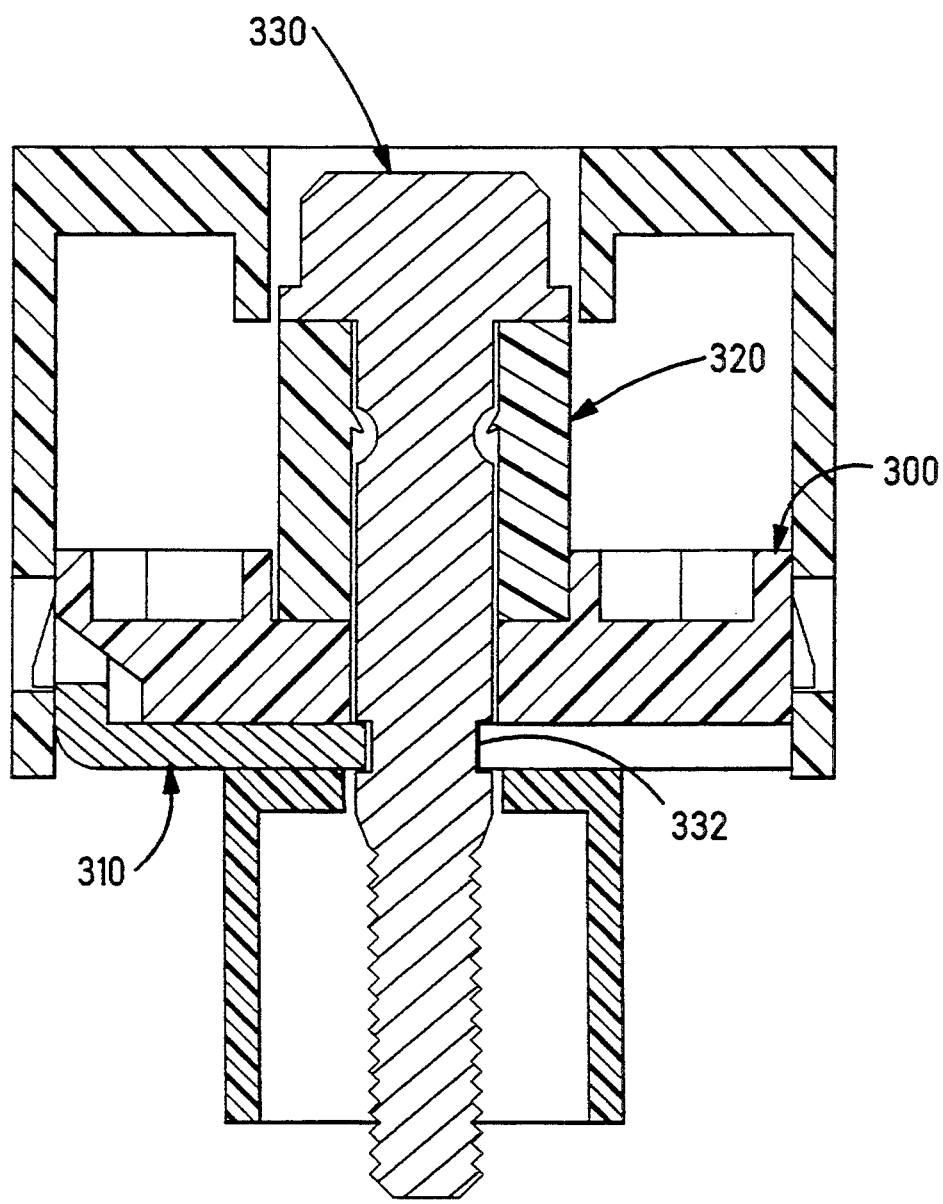
FIG. 11 is a cross sectional view of a further conventional connector.

FIGS. 8(A)–(C) represent a metal stopper used in the third embodiment of the bolt-fastened connector according to this invention; FIG. 8(A) is a plan view, FIG. 8(B) is a front view, FIG. 8(C) is a right view. FIG. 9 is a plan view depicting essential elements of a bolt-fastened connector with the metal stopper shown in the FIGS. 8(A)–8(C). FIG. 10 is a cross section along line VIII—VIII shown in the FIG. 9. The difference from the second embodiment consists in that there is only one elastic arm 88" made by bending a portion of one side of the metal stopper 80". The springy portion of this elastic arm 88" is longer than a similar portion of the elastic arm 88 of the second embodiment. Since the reaction produced by deformation is dissipated very well, there is less possibility of residual strain occuring in it. Therefore, it can withstand multiple connections and disconnections of the first housing 10 (FIG. 1). A post 96 limiting deformation of the elastic arm 88" is provided under it as a portion of the metal stopper 80". This arrangement makes it possible to limit deformation of the elastic arm 88" when it is pushed by a tool (not shown in the drawing) during removal of the first housing 10 from the second housing 40".

The metal stopper 80" shown in the FIG. 9 has a bolt receiving opening 84" and a bolt retaining opening 86" which are joined together. The bolt retaining opening 86" prevents removal of the bolt 20 by engaging with the recess 36 of the bolt 20. In the second housing 40", an indicator opening 92" is formed next to the bolt retaining opening 86". On the both sides of the bolt retaining opening 86" a pair of oblong holes 94", 94" is formed as a result of the use of pins (not shown in the drawing) retaining the metal stopper 80" during the insert-molding operation. Unlike in the second embodiment, the elastic arm 88" is covered by the body of the metal stopper 80", except for the deformation-limiting post 96 located under it. During insert-molding of the metal stopper 80' in the second embodiment, it was necessary to cover the elastic arm 88 by metal pins from above and below, in order to prevent it from being covered by resin. Therefore, it was impossible to form plastic parts near this elastic arm, which tended to reduce the strength of retention of the metal stopper 80'. However, in the third embodiment, plastic parts may be molded around the metal stopper 80" except for the section under the elastic arm 88". Therefore, as shown in the FIG. 10, the metal stopper 80" is supported from underneath by a thick layer of plastic, which provides a stronger support than in the case of the metal stopper 80'. This is especially important when it is necessary to withstand forces developped when the bolt 20 is threaded in the nut (not shown in the drawing).

The procedure of assembly of the first housing 10 having the bolt 20 with the second housing 40" having imbedded metal stopper 80" is the same as in the case of the second embodiment. Namely, the tip of the bolt 20 is inserted in the bolt-receiving opening 84", the other end of the first housing 10 is pressed against the bottom surface 62" of the second housing 40" and the first housing 10 is slid in the direction of the arrow B" along the bottom surface 62". When the recess 36 of the bolt 20 becomes engaged with the retaining opening 86", the elastic arm 88" snaps back to its original position, thus preventing the first housing from removal by applying the side surface 90" of the elastic arm 88" against the side surface of the first housing.

Metal stoppers 80, 80', 80" need not be necessarily embedded by insert-molding process. They can be secured prior to the insertion of the contacts by means in the slots molded in the sides of the housing.

According to this invention, the bolt and the first housing can be easily secured in the second housing without using special tools due to the engagement of the metal member and the bolt recess. Another advantage of this invention consists in the fact that the metal member does not occupy a large area, thus making it possible to achieve compactness and high density of elements.

I claim:

1. A bolt-fastening connector having electrical contacts and adapted to mate with another connector having corresponding mating contacts, the bolt-fastening connector, comprising:
   a first housing having an opening in which an upper section of a shaft of a bolt is disposed, a head of the bolt engages an upper surface of the first housing;
   a second housing having a through hole along which a lower section of the bolt extends when the first housing is positioned onto the second housing; and
   a retaining member embedded in a wall of said through hole, said retaining member including a retaining section engaging a section of said lower section of said bolt thereby retaining said first housing with said bolt therein on said second housing.

2. A bolt-fastening connector as claimed in claim 1, wherein said retaining member is an annular-shaped metal member and includes spring blades engagable within a recess of the bolt shaft.

3. A bolt-fastening connector as claimed in claim 2, wherein spaced ribs extend outwardly from said wall between adjacent spring blades.

4. A bolt-fastening connector as claimed in claim 1, wherein said retaining member is a flat metal member having a cut-out and a bolt-retaining recess in which said bolt is disposed.

5. A bolt-fastening connector as claimed in claim 4, wherein said flat metal member includes spring arms adjacent said cut-out for engagement with said first housing.

6. A bolt-fastening connector as claimed in claim 4, wherein said flat metal member includes a spring arm adjacent said cut-out for engagement with said first housing.

7. A bolt-fastening connector as claimed in claim 6, wherein a post is provided under said spring arm to limit deformation of said spring arm.

8. A bolt-fastening connector as claimed in claim 4, wherein said flat metal member is insert molded into said second housing.

9. A bolt-fastening connector as claimed in claim 1, wherein said first housing has an indicator mounted therein parallel to said opening and said second housing has a slot adjacent said through hole in which a bottom section of said indicator is disposed.

10. A bolt-fastening connector as claimed in claim 1, wherein said bolt has a hole therethrough.

* * * * *